(12) United States Patent
Hiatt, Jr.

(10) Patent No.: US 7,072,687 B2
(45) Date of Patent: Jul. 4, 2006

(54) SYSTEM FOR TRANSFERRING AN ADDRESS LIST AND METHOD

(76) Inventor: Aden Dale Hiatt, Jr., 3265 El Pomar Rd., Colorado Springs, CO (US) 80906

( * ) Notice: Subject to any disclaimer, the term of this patent is extended or adjusted under 35 U.S.C. 154(b) by 712 days.

(21) Appl. No.: 09/406,001

(22) Filed: Sep. 24, 1999

(65) Prior Publication Data

US 2001/0016487 A1 Aug. 23, 2001

Related U.S. Application Data

(60) Provisional application No. 60/122,483, filed on Feb. 26, 1999.

(51) Int. Cl.
*H04M 1/00* (2006.01)

(52) U.S. Cl. .................. 455/556.2; 455/414.3

(58) Field of Classification Search ........... 455/422, 455/418–420, 466, 426, 433, 414, 554, 558, 455/560, 561, 414.3, 556.2; 709/218, 231, 709/232
See application file for complete search history.

(56) References Cited

U.S. PATENT DOCUMENTS

| | | | |
|---|---|---|---|
| 5,251,255 A | 10/1993 | Epley | 379/242 |
| 5,274,802 A | 12/1993 | Altine | 395/600 |
| 5,321,737 A * | 6/1994 | Patsiokas | 455/414 |
| 5,392,390 A | 2/1995 | Crozier | 395/161 |
| 5,577,103 A * | 11/1996 | Foti | 455/412 |
| 5,737,595 A | 4/1998 | Cohen et al. | 395/611 |
| 5,742,668 A * | 4/1998 | Pepe et al. | 379/58 |
| 5,742,905 A | 4/1998 | Pepe et al. | 455/461 |
| 5,768,509 A * | 6/1998 | Gunluk | 709/203 |
| 5,771,455 A * | 6/1998 | Kennedy, III et al. | 455/456 |
| 5,781,910 A | 7/1998 | Gostanian et al. | 707/201 |
| 5,786,819 A * | 7/1998 | Weiser et al. | |
| 5,794,144 A * | 8/1998 | Comer et al. | 455/426 |
| 5,841,852 A | 11/1998 | He | 379/201 |
| 5,864,861 A | 1/1999 | Williams | 707/101 |
| 5,875,405 A * | 2/1999 | Honda | 455/564 |
| 5,915,225 A * | 6/1999 | Mills | 455/558 |
| 5,920,826 A * | 7/1999 | Metso et al. | 455/557 |
| 5,926,756 A * | 7/1999 | Piosenka | 455/418 |
| 6,026,291 A * | 2/2000 | Carlsson et al. | 455/406 |
| 6,049,796 A | 4/2000 | Siitonen et al. | |
| 6,061,571 A * | 5/2000 | Tamura | 455/463 |
| 6,144,859 A * | 11/2000 | LaDue | 455/511 |
| 6,269,369 B1 * | 7/2001 | Robertson | |
| 6,321,257 B1 * | 11/2001 | Kotola et al. | 709/219 |
| 6,324,542 B1 * | 11/2001 | Wright, Jr. et al. | |
| 6,334,126 B1 * | 12/2001 | Nagatomo et al. | |

OTHER PUBLICATIONS

"OL97: User Profiles and Information Services" MicroSoft Corp Pub Q162203.*

(Continued)

*Primary Examiner*—Charles Craver
(74) *Attorney, Agent, or Firm*—Law Office of Dale B. Halling, LLC

(57) ABSTRACT

A system (10) for transferring an address list includes a portable wireless electronic device (12). A wireless communication system (16) is capable of establishing a wireless communication link (14) with the portable wireless electronic device (12). A wireline communication network (18) is connected to the wireless communication system (16). A computer (20) is connected to the wireline communication network (18). The computer (20) contains an address software that sends a plurality of addresses to the portable wireless electronic device (12).

19 Claims, 5 Drawing Sheets

OTHER PUBLICATIONS

"OL97: How to Copy the Personal Address Book to Another Computer" MicroSoft Corp Pub Q169709.*

"Retooled MS Office 97 Still the Leader" Rich Cunningham, http://www.worldvillage.com pp. 1-6.*

"Multimedia and Portability Advance in '97" Michael Cheek, GCN pp. 1-8.*

"Importing Personal Address Book (PAB) to Outlook 97" Grant Hill, Jan. 20, 1998 p. 1.*

"OL97: Microsoft Outlook Version Information" MicroSoft Corp Pub Q172623 Nov. 14, 2001.*

"Yahoo! Address Book to Outlook 97/98" Yahoo! Inc p. 1.*

"Outlook 97/98 to Yahoo! Address Book" Yahoo! Inc p. 1.*

* cited by examiner

SYSTEM FOR TRANSFERRING AN ADDRESS LIST AND METHOD

This application claims the benefit of provisional application No. 60/122,483, filed Feb. 26, 1999.

FIELD OF THE INVENTION

The present invention relates generally to the field of communications and more particularly to a system for transferring an address list and method.

BACKGROUND OF THE INVENTION

Personal communication devices such as cellular (PCS—Personal Communication Systems) telephones, pagers and PDAs (Personal Digital Assistants) have become very popular. These devices store address information such as names, telephone numbers and email address. Unfortunately, most of these devices have no way to share this information with other devices, such as personal computers that contain address databases. Large companies often have centralized address databases of their clients. A salesman who is new to the company or takes over a new territory has to enter the address information manually.

Some PDAs do have an infra-red communication link that allows them to share information with a personal computer. This requires that the user be within line of sight in order to establish the communication link. It also does not allow the user to communicate with a centralized server.

Thus there exists a need for a system that transfers an address list between any computer and personal communication device or between personal communication devices. The system should allow the user to initiate the transfer from anywhere the personal communication device is able to obtain normal communication coverage.

DETAILED DESCRIPTION OF THE DRAWINGS

A system for transferring an address list includes a portable wireless electronic device. A wireless communication system is capable of establishing a wireless communication link with the portable wireless electronic device. A wireline communication network is connected to the wireless communication system. A computer is connected to the wireline communication network. The computer contains an address software that sends a plurality of addresses to the portable wireless electronic device. This system allows a user to receive an address list wherever the portable wireless electronic device can obtain wireless coverage. The system is also capable of sending the address list from the portable wireless electronic device to the computer.

Figure 1:
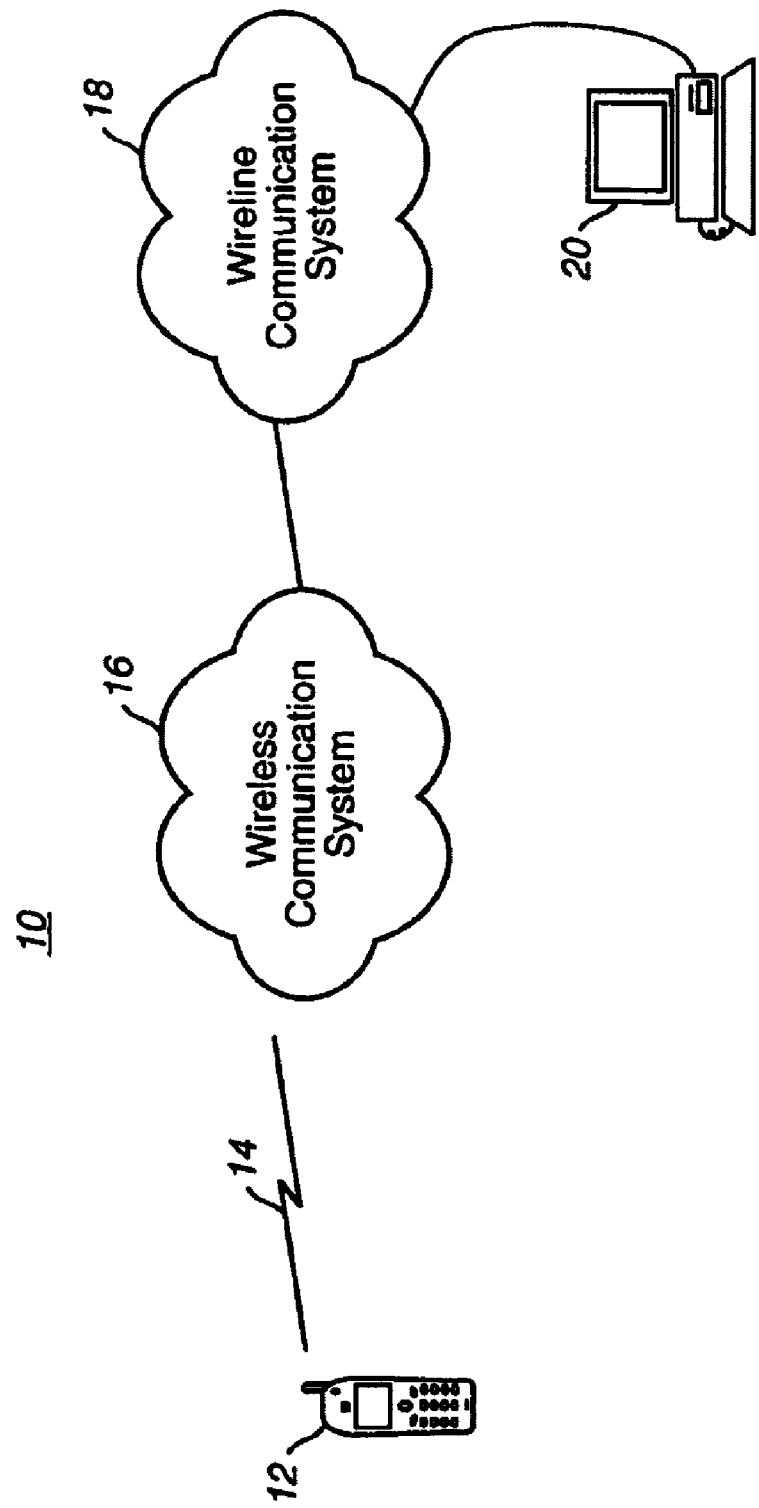
FIG. 1 is a schematic diagram of a system for transferring an address list in accordance with one embodiment of the invention.

FIG. 1 is a schematic diagram of a system 10 for transferring an address list in accordance with one embodiment of the invention. A portable wireless electronic device 12 has a wireless communication link 14 with a wireless communication system 16. The wireless communication system 16 is connected to a wireline communication system 18. A computer 20 is connected to the wireline communication system 18. The computer 20 runs an address software that is capable of sending a plurality of addresses (or a single address) to the portable wireless electronic device 12. In addition the address software can be used to receive addresses from the portable wireless electronic device 12.

Figure 2:
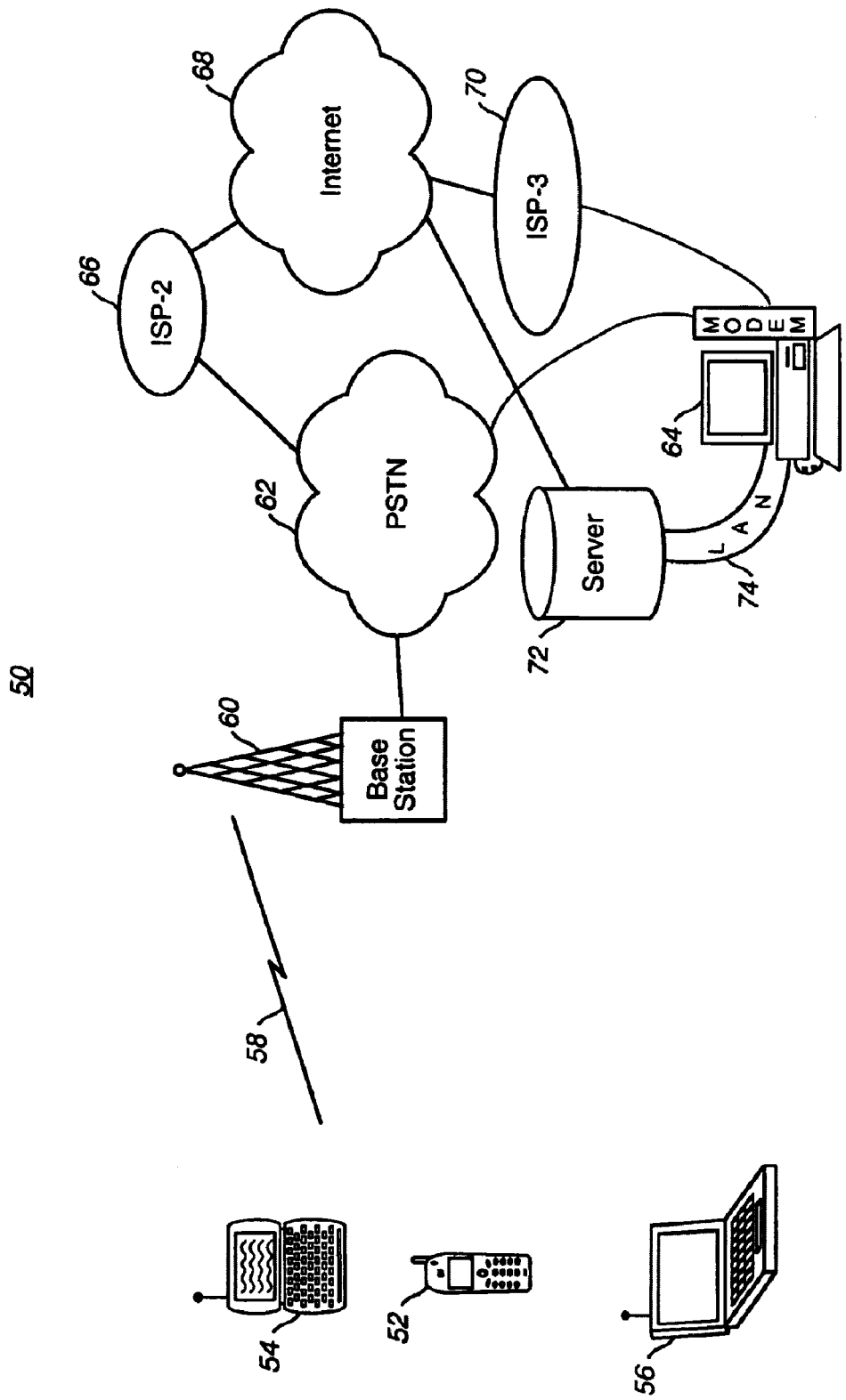
FIG. 2 is a schematic diagram of a system for transferring an address list in accordance with one embodiment of the invention.

FIG. 2 is a schematic diagram of a system 50 for transferring an address list in accordance with one embodiment of the invention. A portable wireless device, such as a cellular (PSC) telephone 52, PDA (Personal Digital Assistant) 54, portable computer 56 or pager, has a wireless connection 58 to a base station 60. The base station 60 is part of a wireless communication system, such as a cellular (PCS) network, a pager network, or a wireless computer/PDA network. The base station 60 is connected to the public switched telephone network (PSTN) 62. In one embodiment, the PSTN 62 connects directly to a modem of a computer 64. In another embodiment, the PSTN 62 connects to a LAN (Local Area Network) that is connected to the computer 64.

In one embodiment the PSTN 62 connects to an ISP (internet service provider) 66. The ISP 66 provides access to the internet 68. A second ISP 70 is connected to the modem of the computer 64. In another embodiment the internet 68 is connected to a server 72. The server is connected to the computer 64 by a LAN 74.

A user operates the system by selecting an address program on his portable wireless electronic device 52, 54, 56. The program asks him for an electronic address, such as the telephone number of the modem of the computer 64 or the telephone number of his ISP 66 and the URL (universal resource locator) of the computer 64. Note in one embodiment, the server 72 is the main repository of the address lists. In this case the user would enter a URL of the server 72. When the user enters the telephone number of the modem of the computer 64, the portable electronic device establishes a wireless connection with the base station 60. The base station establishes a connection with the computer 64 through the PSTN 64. The user then selects an address file to upload (download). In one embodiment, the user can select a plurality of fields for transfer. For instance, a user may only want the names and telephone numbers for his cellular phone even though the computer's addresses includes street addresses and email addresses.

Alternatively the user can connect to the computer 64 or server 72 as if he were connected to a world wide web (WWW) site. In this case the user would establish a connection to his ISP 66 and then enter a URL of the server 72 (computer). The server 72 would respond with a web page that included choices such as upload-download, file, fields and selected entries. The users input would be similar to a standard web page with hyperlinks. In this case a digital personal communication system protocol used for the connection 58 would encapsulate a wide area network protocol, such as an internet protocol. Note other wide area network protocols are also contemplated by the invention. The internet protocol would encapsulate a HTML (hyper text markup language—hypertext protocol) protocol.

In another embodiment the user sends an email with his request to his ISP. The computer 64 downloads the email and executes the address transfer program based on the information in the email. The response is sent via email to the user. The user's electronic device downloads the response and updates the address file. In this case the digital personal communication system protocol would encapsulate the internet protocol and the internet protocol would encapsulate the SMTP (Simple Mail Transfer Protocol). Note that other electronic mail protocols could also be used.

The system can also be setup so that there is a transfer between portable wireless electronic devices. In this case the wireless communication system would establish a connection between the two portable wireless electronic devices. This connection may go through the PSTN 62.

In another embodiment the user wants to send updated files from his portable wireless electronic device 52, 54, 56 to his personal computer 64 (or server 72). In this case the user pulls up his address program and selects upload or transfer to computer option. The communication system works similarly to the examples shown above. Note that the address program includes an updated time stamp. The date stamps of two similar records are compared and the transferred address is only stored if its date stamp is newer than the record already in the file. As a result only new information is stored.

Figure 3:
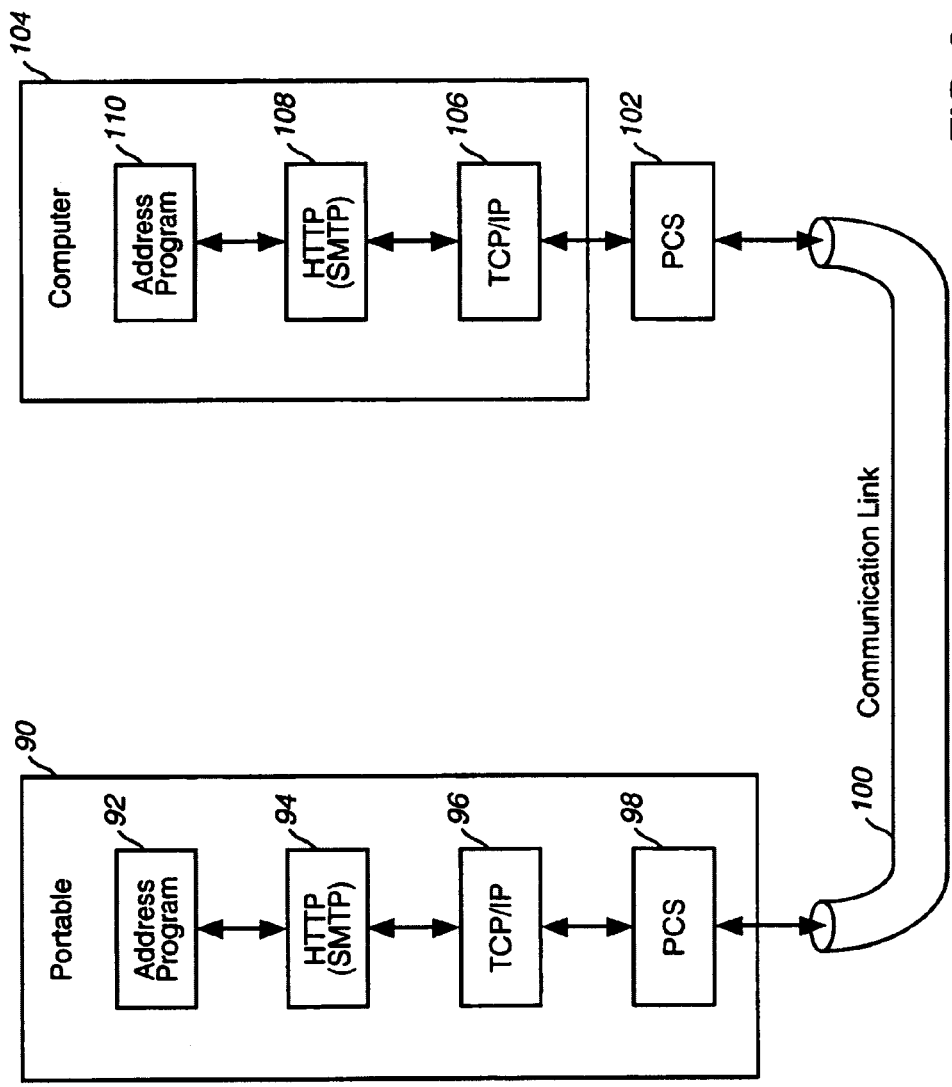
FIG. 3 is a block diagram of a software-communications protocol stack in accordance with one embodiment of the invention.

FIG. 3 is a block diagram of a software-communications protocol stack in accordance with one embodiment of the invention. A portable wireless electronic device 90 has an address transfer program 92. The address transfer program 92 is an application program that communicates with a HTTP (hyper text transfer protocol) layer 94. Note in one embodiment the application program communicates with a SMPT layer. The HTTP layer 94 communicates with a TCP/IP (transmission control protocol/internet protocol) layer 96. The HTTP protocol "packets" are encapsulated into the TCP/IP "packets." The TCP/IP layer 96 communicates with a PCS (personal communication System) protocol 98. The PCS protocol frames encapsulate the TCP/IP "packets" (datagrams). The PCS protocol establishes a communication (wireless) link 100 with a PCS layer 102 near the computer 104. The PCS layer strips out the PCS protocol layer overhead. The PCS layer passes the TCP/IP datagrams to a TCP/IP layer 106 of the computer 104. Note in one embodiment a PSTN protocol is used between the PCS layer 102 and the TCP/IP layer 106. The TCP/IP layer 106 strips out the TCP/IP overhead information and passes along a HTTP "packet." The HTTP layer 108 strips out the HTTP overhead and passes along the information cargo to the address program 110. This process is reversed for information passing in the opposite direction.

Figure 4:
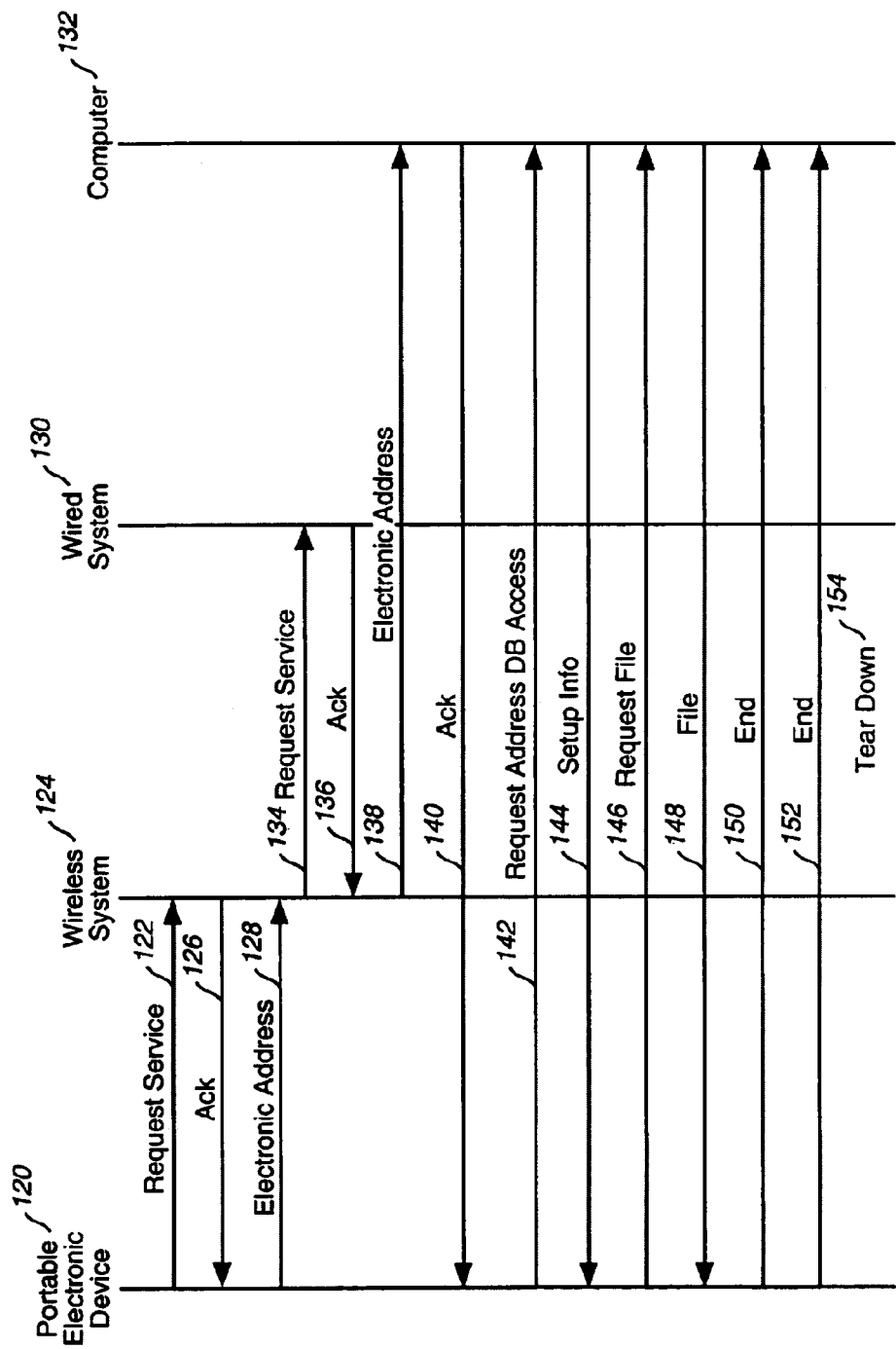
FIG. 4 is a call flow chart of the process in setting up a communication link to transfer an address list in accordance with one embodiment of the invention.

FIG. 4 is a call flow chart of the process in setting up a communication link to transfer an address list in accordance with one embodiment of the invention. A portable wireless electronic device 120 requests service 122 from a wireless system 124. The wireless system 124 responds with an acknowledge 126 when the wireless system 124 has enough capacity. The portable electronic device 120 then sends an electronic address 128 to the wireless system 124. The wireless system 124 recognizes that it requires the assistance of a wired system 130 to complete the connection to the computer 132. The wireless system sends a request for service 134 to the wired system 130. The wired system 130 responds with an acknowledge 136 when it has sufficient capacity to complete the connection. The wired system 130 then forwards an electronic address 138 to the computer 132. The computer responds with an acknowledge 140 to the portable electronic device 120. The portable electronic device 120 sends a request address database access message 142. The computer 132 responds with setup information 144, such as available files (personal, work). The user then selects a file and the device 120 sends a request file 146 to the computer 132. The computer 132 then forwards the file 148 to the portable electronic device 120. Once the file has been received the portable electronic device sends an end message 150. The computer 132 responds with an end message 152. The connection is then torn down 154. Note that this call flow is representative of an address list transfer call flow, however many other call flows are possible. The invention is not limited to any particular call flow.

Figure 5:
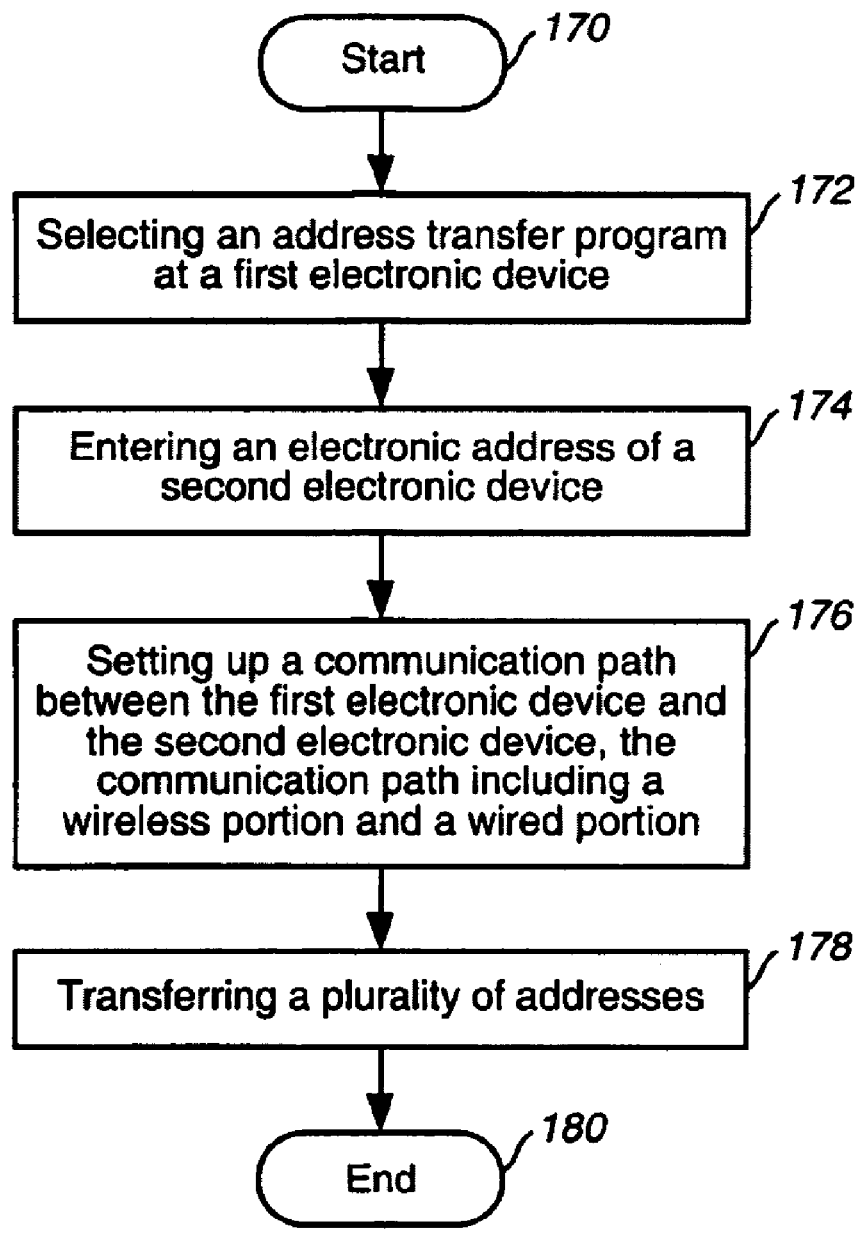
FIG. 5 is a flow chart of the steps used in a method of transferring an address list in accordance with one embodiment of the invention.

FIG. 5 is a flow chart of the steps used in a method of transferring an address list in accordance with one embodiment of the invention. The process starts, step 170, by selecting an address transfer program at a first electronic device at step 172. An electronic address of a second electronic device is entered at step 174. A communication path between the first electronic device and the second electronic device at step 176, the communication path includes a wireless portion and a wired portion. At step 178 the plurality of addresses are transferred which ends the process at step 180. In one embodiment the plurality of addresses are transferred from the second electronic device to the first electronic device. In another embodiment, the plurality of addresses are transferred from the first electronic device to the second electronic device.

In one embodiment the user selects a file of addresses. For instance, the user could select personal addresses, business addresses or from another file. In one embodiment the user selects a field in the file of addresses. A field is the name, street addresses, etc. A user downloading addresses to his cellular phone may only want to select the name field and telephone number field.

In one embodiment the electronic address is a telephone number. In another embodiment the electronic address is an email address or URL.

In one embodiment the invention is implemented as a computer-readable program containing computer readable instructions. The program when implemented displays an address transfer option. The program then requests an electronic address of an electronic device. The program then directs that a communication link with the electronic device be established through a communication network. The program then receives a plurality of addresses. In one embodiment the user selects a file of addresses to receive. In another embodiment the user selects a field in the file of addresses.

Thus there has been described a system and method of transferring an address list between any computer and personal communication device or between personal communication devices. The system also allows the user to initiate the transfer from anywhere the personal communication device is able to obtain normal communication coverage.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for transferring an address list, comprising:
   a personal communication device containing an address database;

a wireless communication system capable of establishing a wireless communication link with the personal communication device;

a wireline communication network connected to the wireless communication system; and a computer connected to the wireline communication network, the computer containing an address software that is capable of extracting a plurality of addresses in an address database and sending the plurality of addresses to the personal communication device, the personal communication device storing the plurality of addresses in the address database of the personal communication device, wherein the computer is not part of the wireline communication network and is not part of the wireless communication system.

2. The system of claim 1, wherein the personal communication device is a cellular telephone.

3. The system of claim 2, wherein the wireless communication link is a digital personal communication system protocol that encapsulates a wide area network protocol.

4. The system of claim 2, wherein an internet protocol encapsulates a hypertext protocol.

5. The system of claim 2, wherein an internet protocol encapsulates an electronic mail protocol.

6. The system of claim 2, wherein the cellular telephone contains an address transfer program.

7. The system of claim 6, wherein the address transfer program requests a telephone number for a transfer.

8. The system of claim 7, wherein the address transfer program requests a file name for the transfer.

9. The system of claim 7, wherein the address transfer program allows a user to select a plurality of address fields for the transfer.

10. A method of transferring an address list, comprising the steps of:
 (a) selecting an address transfer program at a first electronic device, the first electronic device is not part of a wireline communication network and is not part of a wireless communication system, the first electronic device containing a first address book;
 (b) entering an electronic address of a personal communication device, the personal communication device is not part of the wireline communication network and is not part of the wireless communication system, the personal communication device containing a second address book;
 (c) setting up a communication path between the first electronic device and the personal communication device, the communication path including a wireless portion and a wired portion; and
 (d) transferring a plurality of addresses from the first address book to the second address book.

11. The method of claim 10, wherein step (d) further includes the step of:
 (d1) transferring the plurality of addresses from the personal communication device to the first electronic device.

12. The method of claim 10, wherein step (a) further includes the step of:
 (a1) selecting a file of addresses.

13. The method of claim 10, wherein step (a) further includes the step of:
 (a1) selecting a field in a file of addresses.

14. The method of claim 10, wherein step (b) further includes the step of:
 (b1) entering a universal resource locator.

15. The method of claim 10, wherein step (b) further includes the step of:
 (b1) entering a telephone number.

16. The method of claim 10, wherein step (b) further includes the step of:
 (b1) entering an email address.

17. A computer-readable program containing computer-readable instructions that when executed by a computer performs the following stops:
 (a) displaying an address transfer option that extracts a plurality of addresses from an address database;
 (b) requesting an electronic address of an electronic device, when the address transfer option is selected;
 (c) establishing a communication link with the electronic device through a communication network; and
 (d) receiving the plurality of addresses at the electronic device and storing the plurality of addresses in an address list of the electronic device.

18. The computer-readable, program of claim 17, wherein step (b) further includes the steps of:
 (b1) selecting a file of addresses.

19. The computer-readable program of claim 17, wherein step (b) further includes the steps of:
 (b1) selecting a field of a file of addresses.

* * * * *